(12) United States Patent
Coumans

(10) Patent No.: US 11,745,467 B2
(45) Date of Patent: Sep. 5, 2023

(54) OBJECT COMPRISING A FIBER REINFORCED PLASTIC AND A CERAMIC MATERIAL AND PROCESS FOR MAKING THE OBJECT

(71) Applicant: Roeland Hubert Christiaan Coumans, Rekem (BE)

(72) Inventor: Roeland Hubert Christiaan Coumans, Rekem (BE)

(*) Notice: Subject to any disclaimer, the term of this patent is extended or adjusted under 35 U.S.C. 154(b) by 565 days.

(21) Appl. No.: 15/568,157

(22) PCT Filed: Apr. 21, 2016

(86) PCT No.: PCT/EP2016/058900
§ 371 (c)(1),
(2) Date: Oct. 20, 2017

(87) PCT Pub. No.: WO2016/170056
PCT Pub. Date: Oct. 27, 2016

(65) Prior Publication Data
US 2018/0141310 A1    May 24, 2018

(30) Foreign Application Priority Data

Apr. 21, 2015 (NL) ..................... 2014687
Jun. 11, 2015 (NL) ..................... 2014955

(51) Int. Cl.
*B32B 15/20*  (2006.01)
*B32B 15/08*  (2006.01)
(Continued)

(52) U.S. Cl.
CPC ............ *B32B 15/08* (2013.01); *B29C 70/683* (2013.01); *B32B 1/08* (2013.01); *B32B 5/02* (2013.01);
(Continued)

(58) Field of Classification Search
CPC ...... F16L 9/02; F16L 58/00–14; B32B 15/08; B32B 1/08
See application file for complete search history.

(56) References Cited

U.S. PATENT DOCUMENTS 4,606,796 A * 8/1986 Hanazima ............... C25D 11/18
205/174
6,468,613 B1 * 10/2002 Kitano ................... B32B 15/08
428/35.8
(Continued)

FOREIGN PATENT DOCUMENTS

CN      102582146 A      7/2012
EP      0 514 640 A1     11/1992
(Continued)

*Primary Examiner* — Laura A Auer
(74) *Attorney, Agent, or Firm* — Hudak, Shunk & Farine Co. LPA

(57) ABSTRACT

An object including a. a fiber reinforced plastic and b. a ceramic material, wherein the ceramic material is prepared by plasma electrolytic oxidation of aluminium. A process for the preparation of the object, including the steps of a. providing aluminium, a fiber reinforced plastic and a resin, or providing aluminium and a precursor of a fiber reinforced plastic comprising fibers and a resin, b. treating, at least partially, the aluminium with plasma electrolytic oxidation to provide a ceramic material, c. attaching the ceramic material to the fiber reinforced plastic with the resin, or attaching the ceramic material to the fibers with the resin, d. curing the resin to provide the object including the fiber reinforced plastic and the ceramic material at least partly bound to the fiber reinforced plastic.

15 Claims, 2 Drawing Sheets

(51) Int. Cl.
    *B29C 70/68*     (2006.01)
    *B32B 7/12*     (2006.01)
    *C23C 8/36*     (2006.01)
    *C23C 28/04*     (2006.01)
    *B32B 1/08*     (2006.01)
    *C23C 24/04*     (2006.01)
    *B32B 5/02*     (2006.01)
    *B32B 15/14*     (2006.01)
    *C23C 28/00*     (2006.01)
    *C23C 8/80*     (2006.01)
    *C25D 11/00*     (2006.01)
    *B29K 705/02*     (2006.01)
    *B29L 31/04*     (2006.01)
    *F16C 33/62*     (2006.01)
    *F16C 33/64*     (2006.01)

(52) U.S. Cl.
    CPC ................ *B32B 7/12* (2013.01); *B32B 15/14* (2013.01); *B32B 15/20* (2013.01); *C23C 8/36* (2013.01); *C23C 8/80* (2013.01); *C23C 24/04* (2013.01); *C23C 28/00* (2013.01); *C23C 28/046* (2013.01); *C25D 11/00* (2013.01); *B29K 2705/02* (2013.01); *B29L 2031/04* (2013.01); *B32B 2255/06* (2013.01); *B32B 2255/20* (2013.01); *B32B 2255/26* (2013.01); *B32B 2255/28* (2013.01); *B32B 2260/021* (2013.01); *B32B 2260/046* (2013.01); *B32B 2262/106* (2013.01); *B32B 2307/206* (2013.01); *B32B 2307/536* (2013.01); *B32B 2307/554* (2013.01); *B32B 2307/732* (2013.01); *B32B 2605/08* (2013.01); *F16C 33/62* (2013.01); *F16C 33/64* (2013.01)

(56) References Cited

U.S. PATENT DOCUMENTS

2010/0126662 A1     5/2010     Schreiber
2010/0279108 A1*     11/2010     Kuroyama ........ B29C 45/14778
                                                                               428/339

FOREIGN PATENT DOCUMENTS

| EP | 1 129 787 A2 | 9/2001 | |
|---|---|---|---|
| EP | 1 264 708 A2 | 12/2002 | |
| EP | 2 633 979 A1 | 9/2013 | |
| EP | 2 746 062 A1 | 6/2014 | |
| WO | 2006089519 A1 | 8/2006 | |
| WO | WO-2016012779 A1 * | 1/2016 | ............... B32B 5/18 |

* cited by examiner

OBJECT COMPRISING A FIBER REINFORCED PLASTIC AND A CERAMIC MATERIAL AND PROCESS FOR MAKING THE OBJECT

FIELD OF THE INVENTION

The invention is directed to an object comprising a fiber reinforced plastic and a ceramic material and to a process for the preparation of the object.

BACKGROUND OF THE INVENTION

It is known to make objects made of fiber reinforced plastics. These objects are used where light and strong materials are required, for example car parts or machine parts. The problem of many of these parts is a low wear resistance. This becomes visible when the parts are moving and are in contact with other parts.

This problem is solved according to the prior art by the application of a metallic or ceramic layer on the fiber reinforced plastic on the side that is in contact with other parts.

The ceramic or metallic layer can be applied by thermal spray techniques, like for example, plasma spraying or flame spraying.

Thermal spray processes are for example described in EP 0514640, EP 1129787, EP 1264708 and WO 2006/089519.

EP 0514640 describes a process for the application of a metallic or ceramic layer on an object of fiber reinforced plastic. The layer is applied by thermal spraying after the surface of the fiber reinforced plastic is treated to free particles in the surface layer of the fiber reinforced plastic that is said to improve the adhesion between the fiber reinforced plastic and the metallic or ceramic layer after spraying.

EP 1129787 describes coatings on fiber reinforced composites. The coating comprises a first polymeric layer free of fibers and particulate, a second polymeric layer containing a polymeric matrix and a particulate and a thermally sprayed material coats the second polymeric layer.

EP 1264708 describes a process to apply a coating on a rotating body. The rotating body is coated with a thermoset or thermoplastic layer comprising 5-80 vol % metal particles or ceramic particles. This layer is sanded and thereafter a metal layer or ceramic layer is applied thereon by thermal spraying.

WO 2006/089519 describes a coated member that is made of carbon fiber reinforced plastic. This coated member comprises an adhesive layer made of a ductile material, that is selected among the group comprising copper, nickel, iron, lead and tin, and a hard metal or oxide ceramic layer which is applied to the adhesive layer.

CN 102582146 discloses a composite material with magnesium alloy component as a base body, wherein a microarc oxide film layer is arranged on the outer surface of the magnesium alloy component. A carbon fiber/epoxy resin layer is coated and cured on the outer surface of the microarc oxide film layer. CN 102582146 describes that due to the carbon fiber/epoxy resin material on the outer layer, the magnesium alloy is protected, and the corrosion resistance of the composite material is greatly improved. In addition, due to the use of the magnesium alloy, the using amount of the carbon fibers is reduced, which reduces cost. The microarc oxide film is made using an electrode solution having a temperature of 20-30° C., current density of 1 A/dm$^2$-10 A/dm$^2$ and oxidation time of 3 min-10 min. The microarc oxide film has a thickness of 10-50 μm. The microarc oxidation film is porous and has a good adhesion with the magnesium alloy substrate.

The above references all describe that the adhesion between the fiber reinforced plastic and the ceramic layer is important and is difficult to achieve.

SUMMARY OF THE INVENTION

Object of the invention is to improve adhesion between the object made of fiber reinforced plastic and the ceramic material.

It has been surprisingly discovered that the adhesion can be significantly improved in an object comprising a fiber reinforced plastic and a ceramic material, wherein the ceramic material is prepared by plasma electrolytic oxidation of aluminium.

The object has the advantage that an excellent adhesion exists between the fiber reinforced plastic and the ceramic material. The ceramic material in the object has a high porosity on the surface facing the fiber reinforced plastic, resulting in an excellent adhesion. The porosity of the ceramic material decreases with the distance from the fiber reinforced plastic. The ceramic material has a very low porosity at the surface opposite from the fiber reinforced plastic.

The ceramic material is an electrical insulator. This is particularly important when the fiber reinforced plastic is electrically conductive such as by comprising carbon fibers which are electrically conductive. If the fiber reinforced plastic is in a direct contact with aluminium, the electrical conductivity of the carbon fibers and aluminium causes galvanic corrosion. The presence of the ceramic material between the fiber reinforced plastic and aluminium prevents such galvanic corrosion. Another advantage of the objects according to the invention is that the wear resistance of the object is improved by the ceramic material that forms a very hard surface on the object.

The idea of CN 102582146 relates to the use of a magnesium alloy and discloses only the preparation of a microarc oxide film from a magnesium alloy. CN 102582146 does not teach the skilled person to replace the magnesium alloy by aluminium. Even if the magnesium alloy is replaced with aluminium in the preparation of a microarc oxide film of CN 102582146, the conditions taught in CN 102582146 will not lead to the ceramic material as required in the present invention.

DETAILED DESCRIPTION OF THE INVENTION

Figure 1:
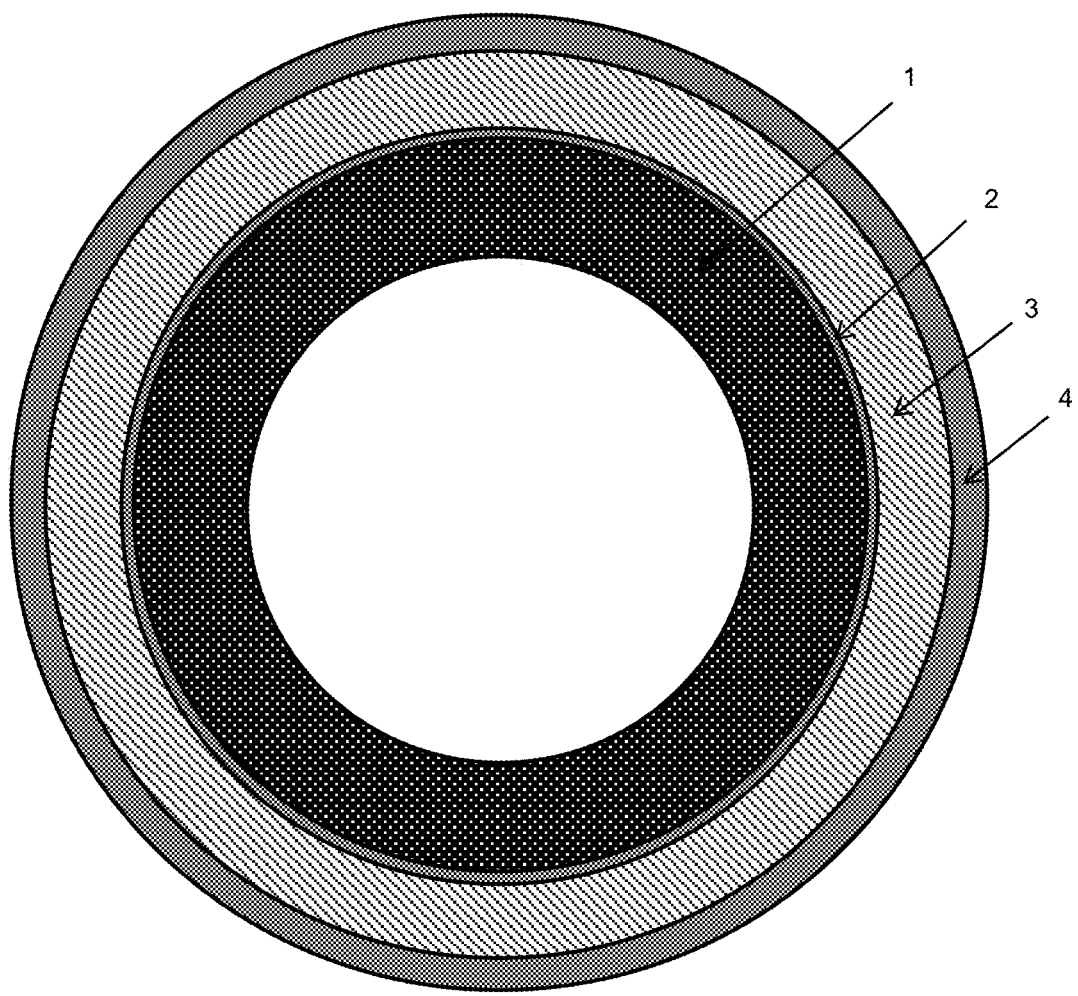
FIG. 1 discloses an object (like a cross section of a tube) having an innerlayer prepared from carbon fiber reinforced plastic (1), an inner layer of ceramic material (2), a layer of aluminium (3) and an outer layer of ceramic material (4).

The object according to the invention comprises a fiber reinforced plastic. The plastic in the fiber reinforced plastic can be a thermoset resin composition but also a thermoplastic resin composition. Examples of resins are epoxies, polyesters, vinyl esters, phenolic resins or nylons.

Preferably, the fiber reinforced plastic comprises a thermoset resin composition.

The fibers in the fiber reinforced plastic can, for example, be chosen from carbon fibers, glass fibers, silicon carbide fibers, and fibers of many other oxides, carbides, aramid e.g. Kevlar® and Twaron®, ultra-high-molecular-weight polyethylene (UHMWPE) and other fiber materials.

Preferably, the fiber reinforced plastic comprises carbon fibers.

The fibers may be very long and may be positioned in specific patterns or can be relatively short and randomly dispersed. When long fibers are positioned in specific patterns, they can be aligned in a single direction or positioned in patterns designed to give two or three dimensional strength to the fiber reinforced plastic. For example, from the fibers an unidirectional sheet can be created. These sheets can be layered onto each other in a quasi-isotropic layup, e.g. 0°, +60° or −60° relative to each other. From the fibers also a bidirectional woven sheet can be created.

The mechanical properties of the fiber reinforced plastic can be tailored to the specific requirements of the object. Fiber-reinforced polymers are composite materials. The composite consists of two parts: a matrix resin and a fiber reinforcement. In carbon fiber reinforced plastic the reinforcement is carbon fiber, which provides the strength. The matrix resin is preferably a thermoset resin, such as epoxy, to bind the reinforcements together. Because carbon fiber reinforced plastic consists of two distinct materials, the material properties depend on these two materials.

The properties of the object can also be affected by the type of additives introduced to the resin. The most frequently used additive is silica, but other additives such as rubber and carbon nanotubes can also be used.

The object according to the invention comprises a ceramic material. A ceramic material is an inorganic, nonmetallic solid comprising metal, nonmetal or metalloid atoms primarily held in ionic and covalent bonds. The crystallinity of ceramic materials ranges from highly oriented to semi-crystalline, and often completely amorphous (e.g., glasses). When aluminium is treated with plasma electrolytic oxidation, aluminium is converted to aluminium oxide, which in turn is partially converted from amorphous alumina into crystalline forms such as corundum ($\alpha$-$Al_2O_3$).

Properties of the ceramic material are a high melting temperature, high hardness, poor conductivity, high modulus of elasticity, chemical resistance and low ductility.

In the object according to the invention the ceramic material is prepared by plasma electrolytic oxidation of aluminium. Plasma electrolytic oxidation (PEO), also known as microarc oxidation (MAO), is an electrochemical surface treatment process for generating ceramic coatings on metals. This process can be used to grow thick (tens or hundreds of micrometers), largely crystalline, oxide coatings (ceramic) on aluminium. Because of their high hardness and a continuous barrier, these coatings can offer protection against wear, corrosion or heat as well as electrical insulation. The coating is an electro-chemical conversion of aluminium into its oxide, and grows both inwards and outwards from the original metal surface. Because it is a conversion coating, rather than a deposited coating (such as a coating formed by thermal spraying), it has excellent adhesion to the metal.

During PEO a layer of oxide is grown on the surface of the metal by the application of electrical potential, while the part is immersed in an electrolyte.

In plasma electrolytic oxidation, high voltage is applied. For example, in the plasma electrolytic oxidation of aluminium, at least 200 V must be applied. Typically the voltage ranges between 200 and 400 V. This locally exceeds the dielectric breakdown potential of the growing oxide film, and discharges occur. These discharges result in localized plasma reactions, with conditions of high temperature and pressure which modify the growing oxide. Processes include melting, melt-flow, re-solidification, sintering and densification of the growing oxide. The metal is immersed in a bath of an electrolyte, which usually is an aqueous solution comprising salts and bases. It is electrically connected, so as to become one of the electrodes in the electrochemical cell, with the other "counter-electrode" typically being made from an inert material such as stainless steel, and often consisting of the wall of the bath itself. Voltages of over 200 V are applied between these two electrodes. These may be continuous or pulsed direct current (DC) (in which case the part is simply an anode in DC operation), or alternating pulses (alternating current or "pulsed bi-polar" operation) where the stainless steel counter electrode might just be earthed. The ceramic film is preferably produced on the aluminium in a bath of an electrolyte, with a current density between 10 $A/dm^2$ and 20 $A/dm^2$, during a time between 15 and 120 minutes. The electrolyte bath preferably comprises a metal pyrophosphate (for example sodium pyrophosphate), a metal silicate (for example sodium silicate) and potassium or sodium hydroxide dissolved in water. A preferred electrolytic bath can contain between 1-10 g/l sodium pyrophosphate, between 0.5-10 g/l sodium silicate and between 0.5 and 10 g/l potassium hydroxide.

Depending on the thickness of the metal a part or the complete metal is oxidized and transformed into a ceramic material.

The object according to the invention comprises a fiber reinforced plastic and a ceramic material. There is an excellent adhesion between the fiber reinforced plastic and the ceramic material.

The object can have any form, for example a plate, a disc, a cylinder, a cube, a block or any other form.

In the object the ceramic material is at least partially bound to the fiber reinforced plastic. Not all surfaces of the object need to be covered with the ceramic material.

Preferably, the object has a layered structure. More preferably, the object comprises a layer of carbon fiber reinforced plastic and a layer of ceramic material bound to the layer of carbon fiber reinforced plastic.

The thickness of the ceramic material is typically at least 2 µm, preferably at least 3 µm, more preferably at least 4 µm, and most preferably at least 10 µm or 20 µm. The thickness of the ceramic material is preferably less than 150 µm, more preferably less than 120 µm.

The ceramic material in the object typically has a thickness of 2-150 µm, preferably a thickness of 3-120 µm, more preferably a thickness of 4-110 µm, more preferably a thickness between 10-100 µm, or between 20-100 µm.

In cases where the ceramic layer is the outer layer of an object, not only adhesion to the substrate but also wear resistance can be important. When wear resistance is important, the outer layer ceramic film preferably is between 30 and 150 µm thick, more preferably between 40 and 140 µm or between 60 and 120 µm.

An outer layer of ceramic material is bound on one side to a substrate (like carbon fiber reinforced plastic or aluminium) and the other side not bound to a substrate.

Preferably the (outer) ceramic layer has a hardness according to Vickers (HV) of at least 750, preferably at least 1000, more preferably at least 1100. Typically the HV is less than 2000. HV is measured according to DIN EN ISO 6507.

In a preferred embodiment the object comprises a. a layer of carbon fiber reinforced plastic, b. an inner layer of ceramic material and c. a layer of aluminium, wherein the inner layer of ceramic material is between the layer of carbon fiber reinforced plastic and the layer of aluminium and is bound to the layer of carbon fiber reinforced plastic and to the layer of aluminium.

In this preferred embodiment the layer of carbon fiber reinforced plastic preferably has a thickness of more than 0.5 mm, more preferably of more than 0.7 mm, most preferably of more than 1.0 mm. The thickness of the layer of carbon fiber reinforced plastic is preferably less than 5 mm, more preferably less than 4 mm, most preferably less than 3 mm.

The inner layer of ceramic material typically has a thickness of more than 2 µm, preferably more than 3 µm and more preferably more than 4 µm. The thickness of the inner layer ceramic material is preferably less than 25 µm, more preferably less than 20 µm, most preferably less than 15 µm.

The layer of metal preferably has a thickness of more than 0.1 mm, more preferably of more than 0.2 mm, most preferably of more than 0.3 mm. The thickness of the layer of metal is preferably less than 5 mm, more preferably less than 3 mm, most preferably less than 2 mm.

In an object according to the preferred embodiment the layer of carbon fiber reinforced plastic has a thickness of 0.5-5 mm, the layer of ceramic material has a thickness of 2-25 µm and the layer of metal has a thickness of 0.1-5 mm.

Preferably, the layer of ceramic material is present on at least one side of the layer of metal and is prepared by plasma electrolytic oxidation of the metal. In the preferred object the layer of ceramic material can be present on one or on both sides of the layer of metal. The layer of ceramic material is prepared by plasma electrolytic oxidation of the metal before the metal layer with the layer of ceramic material is brought into contact with the layer of carbon fiber reinforced plastic.

In an embodiments, the object according to the invention comprises a. layer of carbon fiber reinforced plastic, b. an inner layer of ceramic material, c. a layer of aluminium and d. an outer layer of ceramic material, wherein the layer of aluminium is positioned between and are bound to the inner layer of ceramic material and the outer layer of ceramic material and wherein the inner layer of ceramic material is bound to the layer of carbon fiber reinforced plastic.

The inner layer of the ceramic material has a function as an electrical insulator. The outer layer of the ceramic material gives wear resistance to the object of the invention as an outer surface of the object. The inner layer of ceramic material has a thickness of at least 2 µm, preferably at least 3 µm and more preferably at least 4 µm. The thickness of the inner layer ceramic material is preferably less than 25 µm, more preferably less than 20 µm, most preferably less than 15 µm.

The outer layer of ceramic material preferably has a thickness between 30 and 150 µm thick, more preferably between 40 and 140 µm or between 60 and 120 µm.

Figure 2:
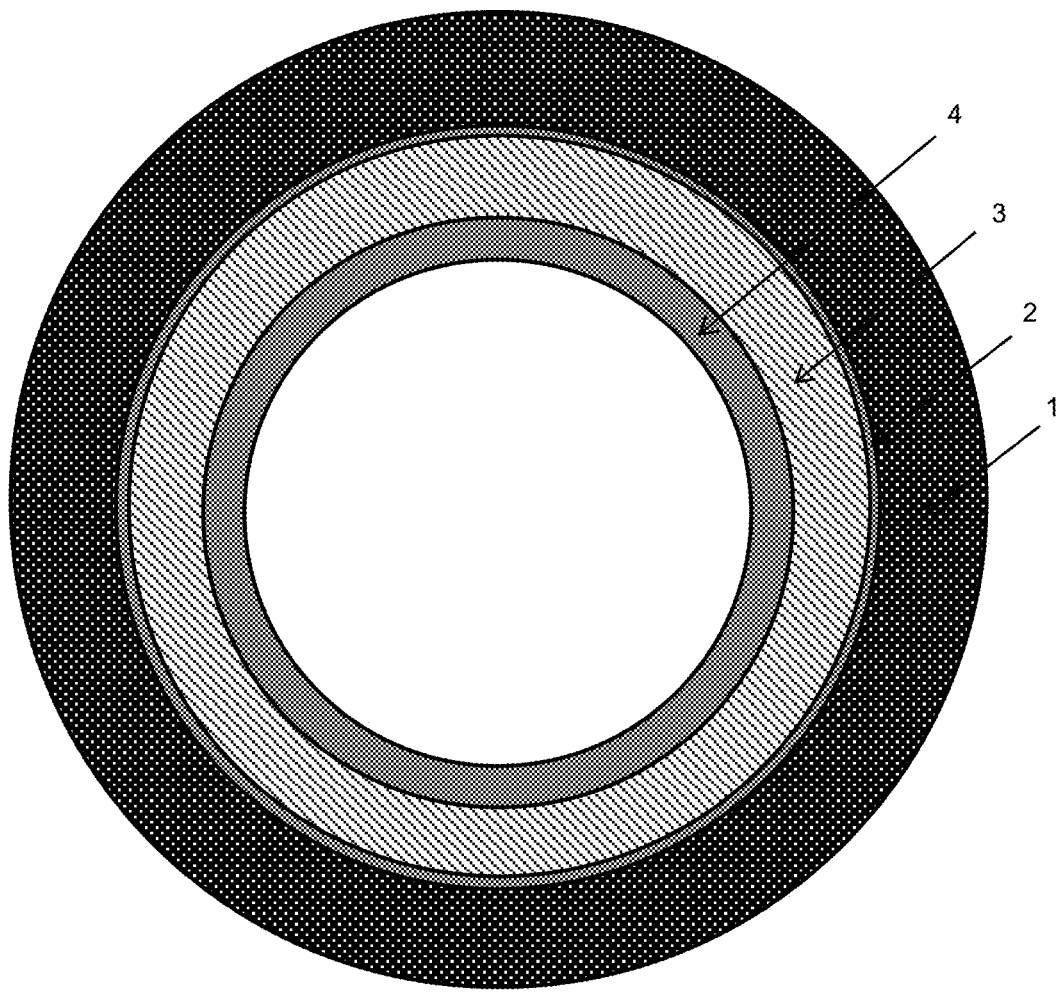
FIG. 2 shows an object (like a cross section of a tube) having a layer prepared from an outer layer of ceramic material (4), a layer of aluminium (3), an inner layer of ceramic (2) and a carbon fiber reinforced plastic (1).

In some preferred embodiments, each of the layers a.-d. has a tubular shape. In some embodiments, the outer layer of the ceramic material forms the inner layer of a tube (see FIG. 2). In some embodiments, the outer layer of the ceramic material forms the outer layer of a tube (see FIG. 1).

The object of the invention can be used for various applications. Especially for applications where a light and wear resistant material is required.

According to one embodiment of the invention the object can be an engine part, more specifically a bearing, a roller or a sprocket. Other examples of objects according to the present invention can be applied in printers, copiers, packaging devices, paper production devices, transport devices or conveyor installations.

According to a second embodiment of the invention the object can be used where a metal part needs to be fastened to a fiber reinforced plastic to improve the adhesion between the metal part and the fiber reinforced plastic. The object can, for example, be a fiber reinforced plastic object with at least one insert comprising ceramic material.

According to a third embodiment of the invention the object is a pipe or a tube. In the pipe or tube the layer of ceramic material can present on one or both sides of the carbon fiber reinforced plastic pipe or tube. These pipes or tubes can for example be used in hydraulic cylinders and shock absorbers which can be used in, for example, a bicycle, a motorbike, a car, an engineering vehicle, production machines or an airplane.

According to a fourth embodiment of the invention the object is a large object made of fiber reinforced plastic, for example a wing or a wing part of an airplane, a blade or blade part of a helicopter, a wing or part of a wing of a windmill, a propeller of an airplane or a screw of a ship.

According to a fifth embodiment of the invention the object can be a slide or a bearing in an XY table or a measuring machine.

The invention is also directed to a process for the preparation of an object, wherein the process comprises the following steps a. providing aluminium and a fiber reinforced plastic or a precursor of a fiber reinforced plastic, b. treating, at least partially, the metal with plasma electrolytic oxidation to provide a ceramic material, c. attaching the ceramic material with a resin to the fiber reinforced plastic or the precursor of a fiber reinforced plastic, d. curing the resin to provide an object comprising a fiber reinforced plastic coated with a ceramic material.

The invention is also directed to a process for the preparation of an object according to the invention, wherein the process comprises the following steps a. providing aluminium, a fiber reinforced plastic and a resin, or providing aluminium and a precursor of a fiber reinforced plastic comprising fibers and a resin, b. treating, at least partially, the aluminium with plasma electrolytic oxidation to provide a ceramic material, c. attaching the ceramic material to the fiber reinforced plastic with the resin; or attaching the ceramic material to the fibers with the resin and d. curing the resin to provide the object comprising the fiber reinforced plastic and the ceramic material at least partly bound to the fiber reinforced plastic.

Preferably the treatment in step b takes place in an electrolytic bath comprising sodium pyrophosphate, sodium silicate and potassium hydroxide dissolved in water, with a current density between 10 $A/dm^2$ and 20 $A/dm^2$, during a time between 15 and 120 minutes.

According to the process of the invention a fiber reinforced plastic and a resin or a precursor of a fiber reinforced plastic is provided. A precursor of a fiber reinforced plastic is a non-cured combination of fibers and resin. A precursor is, for example a non-cured resin comprising fibers or a fiber sheet or can be a fiber sheet that is provided separate from the resin and is combined during the process with the resin to form a fiber reinforced plastic.

The metal is also provided and the surface of the metal is treated, at least partially, with PEO to provide a ceramic material. The ceramic material can be brought in contact with the fiber reinforced plastic or the fibers before the resin is added to the mold or just after the resin is added to the mold. The ceramic material is attached with a resin to the fiber reinforced plastic or the fibers.

A method of producing a fiber reinforced plastic object is, for example, by placing the ceramic material in a mold and layering sheets of carbon fiber cloth into the mold in the shape of the final product. The alignment and weave of the cloth fibers is chosen to optimize the strength and stiffness properties of the resulting material. To obtain the fiber reinforced plastic object the mold is then filled with resin and is cured. Curing of the resin can be obtained by treating the resin with heat, air or UV light.

For objects used in less critical areas the object according to the invention can be manufactured by draping a cloth of fibers over a mold comprising the ceramic material, with resin either pre-impregnated into the fibers (also known as pre-preg) or "painted" over it, and subsequently curing the resin.

High-performance parts using single molds are often vacuum-bagged and/or autoclave-cured, because even small air bubbles in the material will reduce strength. Further compression molding and filament winding can be used to provide the fiber reinforced plastic objects.

During the process the ceramic material is attached with a resin to the fiber reinforced plastic or the fibers. The resin is cured in the presence of the ceramic material to provide an object comprising a fiber reinforced plastic coated with (at least partly bound to) a ceramic material.

In the process for the preparation of the object preferably the surface of the metal is partially treated with plasma electrolytic oxidation (PEO) to provide a ceramic material and the resin is cured to provide an object comprising a fiber reinforced plastic coated with a ceramic material bound to metal. The metal surface of the obtained object can thereafter be further treated by machining, grinding, anodisation, plasma spray coating, flame spray coating, electric-arc spray coating, cold spray coating and/or plasma electrolytic oxidation. The ceramic surface of the obtained object can also be further treated. For example by coating the ceramic surface. Coatings can be applied to reduce friction or to raise friction. Suitable coatings that can reduce friction are for example, a Teflon® coating or a diamond-like-carbon (DLC) coating. A suitable coating that can raise friction is a thermoplastic coating.

Although the invention has been described in detail for purposes of illustration, it is understood that such detail is solely for that purpose and variations can be made therein by those skilled in the art without departing from the spirit and scope of the invention as defined in the claims.

It is further noted that the invention relates to all possible combinations of features described herein, preferred in particular are those combinations of features that are present in the claims.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

What is claimed is:

1. An object, comprising:
   a layer of carbon fiber reinforced plastic,
   an inner layer of ceramic material prepared by plasma electrolytic oxidation of aluminum, wherein the ceramic material comprises aluminum oxide in an amorphous form and a crystalline form, and
   a layer of aluminum,
   wherein the inner layer of ceramic material is between the layer of carbon fiber reinforced plastic and the layer of aluminum and is directly bound to the layer of carbon fiber reinforced plastic and directly bound to the layer of aluminum, and wherein the ceramic material has a hardness according to Vickers (HV) of at least 750.

2. The object according to claim 1, wherein the fiber reinforced plastic comprises a thermoset resin composition.

3. The object according to claim 1, wherein the inner layer of ceramic material has a thickness of 2-150 μm.

4. The object according to claim 1, wherein the object further comprises:
   an outer layer of ceramic material,
   wherein the layer of aluminum is positioned between and is bound to the inner layer of ceramic material and the outer layer of ceramic material.

5. The object according to claim 1, wherein a thickness of the inner ceramic layer ranges between 2 and 25 μm.

6. The object according to claim 4, wherein a thickness of the inner ceramic layer ranges between 2 and 25 μm, and wherein a thickness of the outer ceramic layer ranges between 40 and 140 μm.

7. The object according to claim 1, wherein the layer of carbon fiber reinforced plastic has a thickness of 0.5-5 mm, the inner layer of ceramic material has a thickness of 2-25 μm and the layer of aluminum has a thickness of 0.1-5 mm.

8. The object according to claim 1, wherein the object is an engine part, a bearing or a roller.

9. A process for the preparation of an object according to claim 1, wherein the process comprises the following steps:
   providing aluminum and a fiber reinforced plastic or a precursor of a fiber reinforced plastic,
   treating, at least partially, the aluminum with plasma electrolytic oxidation to provide a ceramic material,
   attaching the ceramic material with a resin to the fiber reinforced plastic or the precursor of a fiber reinforced plastic, and
   curing the resin to provide an object comprising a fiber reinforced plastic coated with a ceramic material.

10. A process for the preparation of an object according to claim 1, wherein the process comprises the following steps
    providing aluminum, a fiber reinforced plastic and a resin, or providing aluminum and a precursor of a fiber reinforced plastic comprising fibers and a resin,
    treating, at least partially, the aluminum with plasma electrolytic oxidation to provide a ceramic material,
    attaching the ceramic material to the fiber reinforced plastic with the resin, or attaching the ceramic material to the fibers with the resin, and
    curing the resin to provide the object comprising the fiber reinforced plastic and the ceramic material at least partly bound to the fiber reinforced plastic.

11. The process according to claim 9, wherein the aluminum is partially treated with plasma electrolytic oxidation (PEO) to provide a ceramic material and the resin is cured to provide an object comprising a fiber reinforced plastic coated with a ceramic material bound to the metal.

12. The process according to claim 10, wherein the treatment in step b. takes place in an electrolytic bath comprising sodium pyrophosphate, sodium silicate and potassium hydroxide dissolved in water, with a current density between 10 A/dm2 and 20 A/dm2, during a time between 15 and 120 minutes.

13. The process according to claim 12, wherein the aluminum surface of the object is further treated by machining, grinding, anodisation, plasma spray coating, flame spray coating, electric-arc spray coating, cold spray coating and/or plasma electrolytic oxidation.

14. The object according to claim 1, wherein the crystalline form of aluminum oxide includes corundum.

15. The object according to claim 1, wherein porosity of the ceramic material decreases with the distance from the layer of carbon fiber reinforced plastic.

\* \* \* \* \*